United States Patent [19]

Bueyuekgueclue et al.

[11] Patent Number: 4,945,956
[45] Date of Patent: Aug. 7, 1990

[54] DEVICE FOR TRANSFERRING TONER FROM A TRANSPORT CONTAINER INTO A TONER RESERVOIR

[75] Inventors: Mehmet-A Bueyuekgueclue; Manfred Maier, both of Munich, Fed. Rep. of Germany

[73] Assignee: Siemens Aktiengesellschaft, Berlin and Munich, Fed. Rep. of Germany

[21] Appl. No.: 347,883

[22] PCT Filed: Sep. 25, 1987

[86] PCT No.: PCT/DE87/00438
§ 371 Date: Apr. 3, 1989
§ 102(e) Date: Apr. 3, 1989

[87] PCT Pub. No.: WO88/02503
PCT Pub. Date: Apr. 7, 1988

[30] Foreign Application Priority Data
Oct. 2, 1986 [DE] Fed. Rep. of Germany ....... 3633599

[51] Int. Cl.$^5$ .................... B65G 53/24; G03G 15/00
[52] U.S. Cl. .......................................... 141/67; 141/59;
141/65; 141/98; 222/DIG. 1; 355/260;
406/121; 406/134; 406/152
[58] Field of Search ................... 141/59, 1, 65, 44, 67,
141/98; 355/255, 260; 222/DIG. 1; 406/121,
114, 134, 135, 146, 151–153

[56] References Cited
U.S. PATENT DOCUMENTS

| 2,419,386 | 4/1947 | Berg . | |
|---|---|---|---|
| 2,621,156 | 12/1952 | Farrell | 406/121 |
| 3,754,580 | 8/1973 | Perry | 141/65 |
| 3,784,297 | 1/1974 | Ito et al. . | |
| 3,883,240 | 5/1975 | Ito et al. . | |
| 3,994,532 | 11/1976 | Hahn | 141/67 X |
| 4,083,607 | 4/1978 | Mott | 141/67 X |
| 4,186,782 | 2/1980 | Scharf | 141/59 X |
| 4,265,572 | 5/1981 | Bourdois et al. | 406/114 |
| 4,305,529 | 12/1981 | Spehrley, Jr. | 222/DIG. 1 |
| 4,561,759 | 12/1985 | Knott . | |
| 4,583,660 | 4/1986 | La Barre et al. | 222/DIG. 1 |

OTHER PUBLICATIONS

Patent Abstracts of Japan, vol. 10, No. 223, (P-483) (2279), Aug. 5, 1986, Toner Replenishing Device, 61-59646.
Research Disclosure, Jan. 1982, No. 213, Havant Hampshire, Great Britain, 21333, Pneumatic toner transport.
Daniel J. Harmon, "Pneumatic Toner Conveying System", Xerox Disclosure Journal, vol. 1, No. 8, Aug. 1976.

Primary Examiner—Ernest G. Cusick
Attorney, Agent, or Firm—Hill, Van Santen, Steadman & Simpson

[57] ABSTRACT

For decanting toner from a supply bottle into the toner reservoir, an under-pressure is generated in the toner reservoir with the assistance of an exhauster fan. The toner reservoir is connected via a flexible hose to a suction nozzle that can be inserted into the transport container. This suction nozzle is composed of an inside tube that is in communication with the flexible line and of an outside tube that completely surrounds the inside tube at a distance therefrom, this outside tube being open to the environment in its upper part and comprising toner entry openings in its lower part. The air flowing through draws the toner through the toner entry openings. The toner reservoir itself is divided into a settling space and into a suction space, these spaces being separated by a filter. The filter arcs under the influence of the flowing air stream. When it arcs back, the toner adhering thereto breaks off and falls into the settling space.

8 Claims, 3 Drawing Sheets

DEVICE FOR TRANSFERRING TONER FROM A TRANSPORT CONTAINER INTO A TONER RESERVOIR

BACKGROUND OF THE INVENTION

The invention is directed to a device for filling toner from a transport container into a toner reservoir and from the latter into a developer station of an electrophotographic printer or copier means, whereby a suction nozzle comprising a take-in region and introducible into the transport container is provided for decanting the toner from the transport container into the toner reservoir by producing under-pressure in the toner reservoir; and In copier technology and in modern fast data printers that operate on the principle of electrophotography, charge images are generated on a recording medium, for example directly on an intermediate carrier (photoconductive drum) or directly on special paper, and are subsequently inked with a black powder (toner) in a developer station. Given employment of an intermediate carrier, this toner image is subsequently transferred onto normal paper and fixed thereon. As a rule, a two-component developer that is composed of ferromagnetic carrier particles and of the toner particles carrying the color is used. The developer is conducted past the charge image on the intermediate carrier with a magnetic brush arrangement, the toner adhering thereto as a result of electrostatic forces.

An electrophotographic copier means that develops charge images according to the principle addressed above is disclosed, for example, from DE-AS 21 66 667 corresponding to U.S. Pat. Nos. 3,784,297 and 3,883,240.

Due to the inking of the charge images on the intermediate carrier, the toner concentration in the developer mix of the developer station constantly decreases. It is therefore necessary to constantly supply new toner to the developer mix in metered fashion. Since the toner consumption per time unit is extremely high in fast copier means and high-performance data printers, a roomy toner reservoir is used in such apparatus in order to avoid down time caused by refilling toner. When this toner reservoir is empty, the toner that is usually supplied in handy containers is filled into the reservoir. It is thereby important to fill the toner from the container into the reservoir such that no toner is spilled and thereby contaminates the environment.

German Patent 32 24 296 and corresponding U.S. Pat. No. 4,561,759 discloses an apparatus for filling and sieving toner from a container into a toner reservoir. The toner situated in a transport container, namely in a toner bottle, is thereby supplied to a reservoir in that the toner bottle is inverted into a filling aperture of the reservoir. A strainer basket that is closed from the reservoir with a sieve is arranged in the region of the filling aperture, this strainer basket being in communication with an electrical shaker means that can be triggered as needed. The shaker means is thereby triggered by opening the cover that closes the filling aperture.

In such filling devices, there is then the risk that the toner will be spilled given manual decanting from the toner bottle. Since, moreover, the toner is only supplied to the toner reservoir at a defined location, special distributor devices are needed in the toner reservoir in order to guarantee a uniform supply of the toner to the developer station.

Patent Abstracts of Japan, Volume 10, No. 223 (P-483) (2279), 5 Aug. 1986 and JP-A-6159464 also disclose that toner be suctioned from a toner supply container with the assistance of underpressure and be supplied to the development station of an electrophotographic printer or copier means.

SUMMARY OF THE INVENTION

It is an object of the invention to fashion a device of the species initially cited such that the toner can be filled from a simple, cost-beneficial transport container into a reservoir at the apparatus side having large capacity without compacted toner thereby occurring or without toner being spilled.

In a device of the species initially cited, this object is achieved in that the toner reservoir comprises a settling space is in communication with the developer station and comprises a suction space separated from the settling space by a filter, said suction space having an allocated means for generating underpressure, whereby the filter is fashioned such that, first, it arcs outward under the influence of an airstream flowing therethrough and, second, arcs back again given interruption of the airstream.

Advantageous developments of the invention are provided by a grating that limits the outward arc of the filter which is provided opposite the suction space. The filter may also have one or more weights that arc the filter back under the force of gravity. In one embodiment, an elastic net is arranged between the filter and the suction space. A preferred embodiment of the toner transport container has its floor region shaped depressed for accepting the suction nozzle so that the toner collects in this region.

The suction nozzle comprises an inside tube that is open in the take-in region and that is connected to the toner reservoir and comprises an outside tube that envelopes the inside tube at a distance therefrom. The outside tube comprises, first, air intake openings and, second, toner entry openings in the take-in region, so that the intake air flowing through the outside tube entrains the toner through the toner entry openings into the inside the tube. The toner entry openings may also be closed by a toner sieve. A holding mechanism which accepts the toner transport container and has a shaker means may also be provided.

In the invention, the toner is removed from a transport container, namely from the toner bottle, by suction with underpressure via a flexible line in an advantageous way. A suction nozzle is provided for that purpose, this containing an open inside tube in the take-in region and comprising an outside tube that surrounds the inside tube at a distance therefrom. The outside tube is upwardly open and thereby forms an air intake opening. In the take-in region, toner entry openings are arranged at the outside tube. The under-pressure generated via an exhauster effects an air stream through the outside tube and through the inside tube. The toner is entrained into the inside tube passing through the toner entry openings.

Via a flexible line, the toner proceeds into a reservoir that is divided via a filter into a settling space and into a suction space separated from the settling space. The suction space is in communication with an under-pressure pump that generates an under-pressure and as a result whereof the toner settles at the filter of the settling space.

In a further advantageous embodiment of the invention, the filter is fashioned such that, first, it arcs outward under the influence of the flowing air stream and, second, arcs back again when the air stream is interrupted. As a result of the change in shape of the filter surface that is thus produced, toner adhering thereto breaks off and falls into the settling space lying therebelow. A conveyor screw that supplies the toner to the developer station of the printer in metered fashion is arranged at the floor of the settling space. In order to effect this upward arcing and return arcing, one or more weights can be arranged on the filter in an embodiment of the invention.

In order to limit the excursion as a consequence of the suction stream, a grating is provided relative to the suction space.

In a further advantageous embodiment of the invention, a flexible net is provided instead of the grating. In this case, the weight is not allocated to the filter but to this net, whereby the filter is not mechanically stressed by the weights.

BRIEF DESCRIPTION OF THE DRAWINGS

Embodiments of the invention are shown in the drawings and shall be set forth in greater detail below by way of example. Shown are.

DESCRIPTION OF THE PREFERRED EMBODIMENTS

Figure 1:
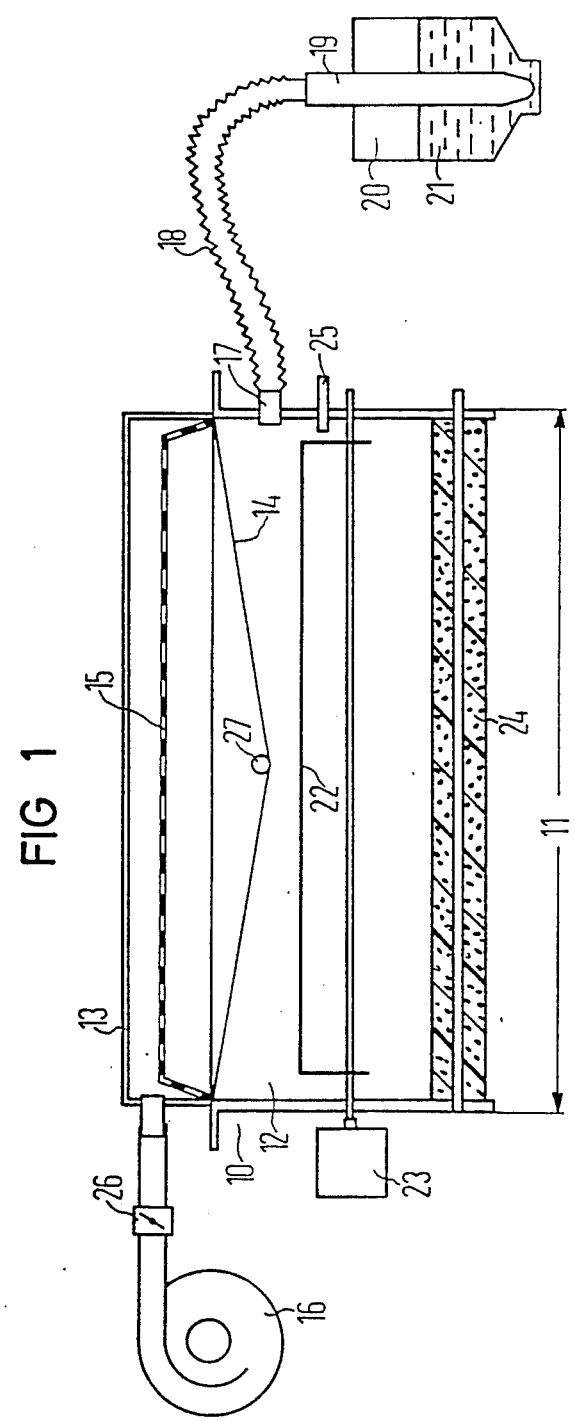
FIG. 1 a schematic illustration of a device for filling toner from a transport container into a toner reservoir—partially in a sectional view—comprising a flexible filter.

A toner reservoir 10 from which the toner is supplied to a developer station 11 for developing charge images is situated in a non-mechanical fast printer means that is not shown in detail here. The toner reservoir 10 has roughly the width of the developer station 11, this approximately corresponding to the printing width and this toner reservoir 10 is divided into a settling space 12 and into a suction space 13. The spaces are separated from one another by a filter 14 that is composed of flexible material. The filter 14 is closed off from the suction space 13 by a grating 15. The openings of the grating can thereby be arranged and dimensioned according to the desired print distributor distribution.

The suction space 13 is in communication with an electromotively driven vacuum pump in the form of an exhauster fan 16.

The settling space 12 comprises a connector nozzle 17 to which a flexible pipe line 18 is connected, this being in turn in communication with a suction nozzle 19. The latter serves for decanting the toner from a toner transport container 20 (toner bottle) into the toner reservoir 10.

For decanting the toner 21 supplied in the toner bottles 20 into the toner reservoir 10 or, respectively, into the developer station 11, the flexible suction line 18 together with the suction nozzle 19 is introduced into the toner bottle and the exhauster fan 16 is then actuated. The low-pressure generated in the suction space 13 generates a corresponding low-pressure in the settling space 12, as a result whereof the toner 21 is suctioned into the settling space 12 according to the vacuum cleaner principle. The toner settles on the filter 14 and falls into the settling space 12. It is blended there via a mixer means 22 that is driven by a motor 23. A metering means likewise driven via the motor 23 and having the form of two oppositely driven rollers 24 of expanded cellular material is arranged in the lower region of the conically fashioned settling space 12. These rollers 24 of expanded cellular material transport the toner to the developer station 11 as needed dependent on the filling level acquired via a filling level sensor 25.

The filter 14 serving the purpose of retaining the toner is elastic and, when the exhauster fan 16 is switched on, arcs in upward direction and places itself against the arcuately shaped grating 15. When the exhauster fan 16 is shut off or when the air stream is interrupted by an under-pressure valve 26, then the filter swings back into its initial position illustrated in FIG. 1, swinging back under the influence of the weights 27 arranged on the surface of the filter 14, only one of these weights being shown here. As a result of the change in shape of the filter surface thereby produced, toner adhering thereto breaks off and falls into the settling space 12 lying therebelow.

Figure 2:
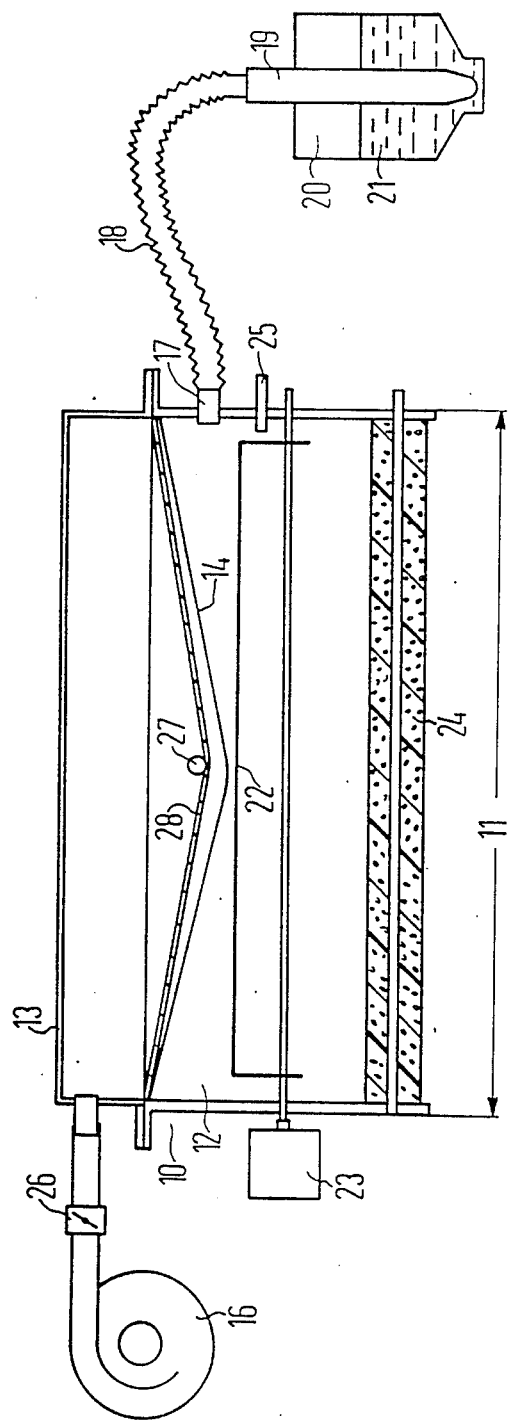
FIG. 2 a schematic illustration of the same device comprising a net for the acceptance of weights.

Given the embodiment shown in FIG. 2, a likewise elastic net 28 for the acceptance of the weights 27 is arranged above the flexible filter 14. The net 28 can thereby be provided instead of the grating 15 in the embodiment of FIG. 1. Since the net 28 accepts the weights 27, the sensitive filter 14 is not additionally stressed by the weights 27.

Figure 3:
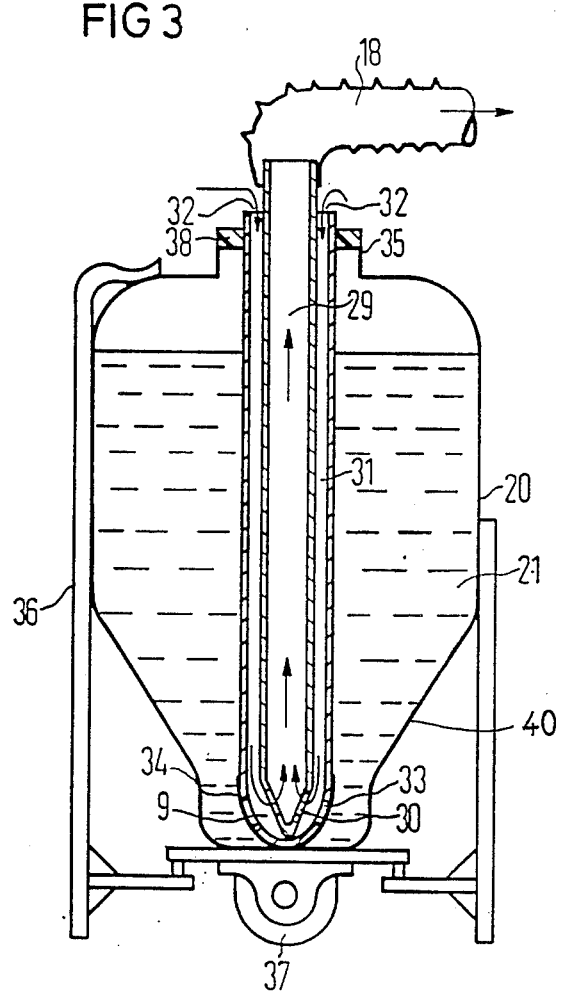
FIG. 3 a schematic sectional view of a toner transport container in the form of a bottle with a suction nozzle arranged therein.

The suction nozzle 19 shown in section in FIG. 3 serves the purpose of suctioning the toner 21 out of the toner bottle 20. This suction nozzle contains an inside tube 29 cut wedgeshaped at its lower end that is in communication with the flexible suction tube 18 and comprises take-in openings 30 for the toner. The inside tube 29 is completely surrounded by an outside tube 31 arranged at a distance therefrom that, first, has its upper part comprising an air intake opening 32 opening into the environment and, second, has toner entry openings 33 at its tip in the take-in region. The guidance and the spacing of the inside tube 29 from the outside tube 31 are effected with spacer elements not shown here that, for example, can be composed of three strips of expanded cellular material uniformly distributed over the circumference.

In order to keep lumpy toner residues from being supplied to the printer station, the toner entry openings 33 can be covered by a toner sieve 34 that covers the take-in region of the suction nozzle.

The device shown in FIG. 3 operates in the following way: the toner bottle 20 conically fashioned in its bottom region whose entry opening 35 is closed by a cover is first latched into a holder mechanism 36 that accepts the toner bottle and at whose floor a shaker means 37 in the form, for example, of an unbalanced motor is situated. The toner bottle 20 is thereby fashioned such or is latched such in the holding mechanism 36 that the suction nozzle 19 inserted for extraction comes to lie with its draw-off region at the lowest location of the toner bottle 20 - namely the conically shaped, depressed part 40. A seal 38 allocated, for example, to the suction nozzle 19 serves the purpose of an appropriate sealing in the region of the entry opening 35.

This seal can be fashioned foil-like and close the container. For initialization, the seal is perforated with the assistance of the suction nozzle.

After the shaker means 37 has been switched on by actuating an unbalanced motor, the toner 21 first migrates into the region of the toner entry openings 33 comprising the toner sieve 34. It then proceeds through the sieve into the interspace between the inside tube 39 and the outside tube 31, namely in the region of the openings 33 of the inside tube. After the exhauster fan 16 is switched on, the toner is seized by the air stream (arrows) that is sucked in proceeding from above and migrates via the flexible line 18 into the settling space 12.

In that the air is taken in from the outside and serves as conveying means for the toner, no toner whatsoever emerges out of the toner bottle into the environment to contaminate it. Although other modifications and changes may be suggested by those skilled in the art, it is the intention of the inventors to embody within the patent warranted hereon all changes and modifications as reasonably and properly come within the scope of their contribution to the art.

We claim:

1. A device for transferring toner from a transport container into a toner reservoir and from the latter into a developer station of an electrophotographic printer or copier means, whereby a suction nozzle comprising a take-in region having a take-in opening and introducible into the transport container is provided for decanting the toner from the transport container into the toner reservoir by producing a low pressure in the toner reservoir, characterized in that the toner reservoir comprises a settling space that is in communication with the developer station and comprises a suction space separated from the settling space by a filter, said suction space being connected to a means for generating a low pressure to establish an airstream, the filter being fashioned such that, first, it arcs outward under the influence of the airstream flowing therethrough and, second, arcs back again given interruptions of the airstream.

2. A device according to claim 1, characterized in that a grating that limits the outward arc of the filter is provided opposite the filter in the suction space.

3. A device according to claim 1, characterized in that the filter comprises one or more weights arranged to cause the filter to arc back under the force of gravity when the airstream is interrupted.

4. A device according to claim 3, characterized in that an elastic net is arranged between the filter and the suction space.

5. A device according to claim 1, characterized in that the toner transport container has a depression in its floor region for the acceptance of the suction nozzle such that the toner collects in this region.

6. A device according to claim 1, wherein the suction nozzle comprises: an inside tube that is open in the take-in region and that is connected to the toner reservoir, and an outside tube that envelopes the inside tube at a distance therefrom, the outside tube comprises air intake openings and toner entry openings in the take-in region, so that intake air flowing through the outside tube draws in the toner through the toner entry openings and carries the toner into the inside tube.

7. A device to claim 6, characterized in that the toner entry openings are closed by a toner sieve.

8. A device according to claim 6, comprising a holding mechanism constructed to accept the toner transport container and including an allocated shaker means.

* * * * *